United States Patent
Maxham (12) 
(10) Patent No.: US 6,671,645 B2
(45) Date of Patent: Dec. 30, 2003

(54) METHOD FOR IN-SERVICE RAM TESTING

(75) Inventor: Kenneth Mark Maxham, Belmont, CA (US)

(73) Assignee: Ciena Corporation, Linthicum, MD (US)

(*) Notice: Subject to any disclaimer, the term of this patent is extended or adjusted under 35 U.S.C. 154(b) by 89 days.

(21) Appl. No.: 09/968,277

(22) Filed: Sep. 28, 2001

(65) Prior Publication Data

US 2003/0065470 A1 Apr. 3, 2003

(51) Int. Cl.⁷ .............................................. G06F 19/00
(52) U.S. Cl. ....................................... 702/117; 714/718
(58) Field of Search ................... 702/117, 80, 118–119, 702/123–124, 126, 183, 189; 711/206–208, 202–203, 2; 714/718–719

(56) References Cited

U.S. PATENT DOCUMENTS

| | | | | |
|---|---|---|---|---|
| 4,899,275 A | | 2/1990 | Sachs et al. ................. 364/200 |
| 5,396,619 A | * | 3/1995 | Walton ........................... 714/8 |
| 5,539,899 A | * | 7/1996 | Huynh et al. ................ 711/171 |
| 5,724,538 A | * | 3/1998 | Morris et al. ................ 711/206 |
| 5,778,411 A | * | 7/1998 | DeMoss et al. ................. 711/4 |
| 5,881,221 A | * | 3/1999 | Hoang et al. ................. 714/42 |
| 5,898,801 A | * | 4/1999 | Braun et al. ................. 385/24 |
| 5,923,836 A | | 7/1999 | Barch et al. ........... 395/183.09 |
| 5,956,475 A | * | 9/1999 | Burckhartt et al. ........... 714/23 |
| 6,247,153 B1 | * | 6/2001 | Jeon et al. .................. 714/718 |
| 6,393,498 B1 | * | 5/2002 | Hou et al. ..................... 710/1 |
| 6,401,185 B1 | * | 6/2002 | Sexton et al. ............... 711/209 |
| 6,453,398 B1 | * | 9/2002 | McKenzie ................... 711/165 |
| 6,467,014 B1 | * | 10/2002 | Bolt ............................. 711/4 |
| 6,477,612 B1 | * | 11/2002 | Wang ............................ 711/2 |
| 6,493,816 B1 | * | 12/2002 | Munroe et al. ............. 707/102 |
| 6,502,211 B1 | * | 12/2002 | Takano ........................ 714/42 |

* cited by examiner

*Primary Examiner*—Marc S. Hoff
*Assistant Examiner*—Mary Catherine Baran
(74) *Attorney, Agent, or Firm*—Michael Cammarata; Shailendra Bhumralkar; Carolyn Baumgardner (57) ABSTRACT

A method for in-service RAM testing in computer systems and networks having a virtual memory. The method involves identifying a number n of physical memory units $p_i$, i=1 . . . n, in the RAM and a number n−1 of virtual memory units $v_j$, j=1 . . . n−1, in the virtual memory, performing a one-to-one mapping to map the physical memory units $p_i$ to virtual memory units $v_j$ such that a physical memory unit $p_x$ is left unmapped, and then testing data in the unmapped physical memory unit $p_x$ by destructive or non-destructive tests. After the test data from another physical memory unit $p_y$ is copied to physical memory unit $p_x$ and a one-to-one re-mapping of physical memory units $p_i$ to virtual memory units $v_j$ is performed such that physical memory unit $p_y$ is left unmapped. The data in physical memory unit $p_y$ is then tested and the steps of copying, one-to-one re-mapping and testing can be repeated until all physical memory units $p_i$ are tested. The testing can be performed with the aid of an MMU and it can involve more than one physical memory page at a time.

23 Claims, 6 Drawing Sheets

METHOD FOR IN-SERVICE RAM TESTING

FIELD OF THE INVENTION

The present invention relates generally to testing of random access memory (RAM), and more particularly to RAM testing while in operation.

BACKGROUND OF THE INVENTION

Modern computer systems come equipped with a central processing unit (CPU) for performing operations on data supplied from various sources including input/output ports, volatile memory units, non-volatile memory units and other. In performing its work the CPU directly or indirectly reads and writes data to the various memory units. To expedite data processing the CPU takes advantage of a random access memory (RAM) because reading data from and writing data to a RAM is the fastest. Thus, in a typical computer system the CPU may read some of the data required for processing, e.g., an application program, from a read-only memory (ROM), but in executing the application it will store the required data in a RAM and communicate with it rather then with the ROM.

Figure 1:
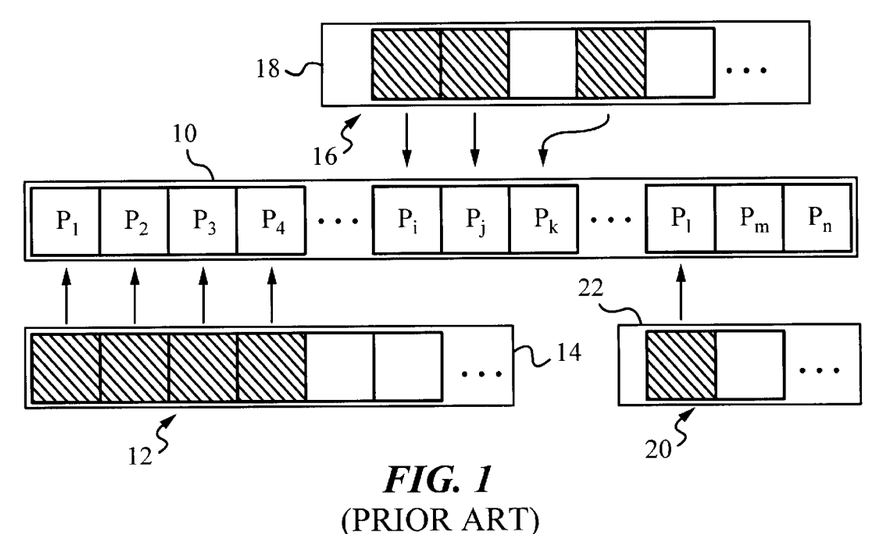
FIG. 1 (prior art) is a diagram illustrating the loading of a physical RAM.

FIG. 1 illustrates a typical volatile RAM 10 with a number of physical memory pages $P_1$ through $P_n$. RAM 10 is usually located on a memory card or another medium affording rapid data access rates. If a ROM is available, the application program is usually resident in the ROM. If a disk is the non-volatile medium, then the pages of the application code are loaded into RAM 10 from the disk as needed. In FIG. 1 an application program 12 is resident on a ROM 14, and the first four pages of code of application program 12 are loaded into pages $P_1$ through $P_4$ of RAM 10. The remainder of application program 12 does not need to be accessed for execution at this time and is thus not loaded from ROM 14. Three non-consecutive pages of a test data file 16 are uploaded into pages $P_i$ through $P_k$ from a disk memory unit 18. One page of a second application program 20 is loaded into page $P_1$ from another non-volatile permanent storage unit 22. Still additional data can be loaded into remaining pages of RAM 10. A CPU can now obtain data directly from RAM 10 to run, for example, application programs 12, 20 on test data 16.

Figure 2:
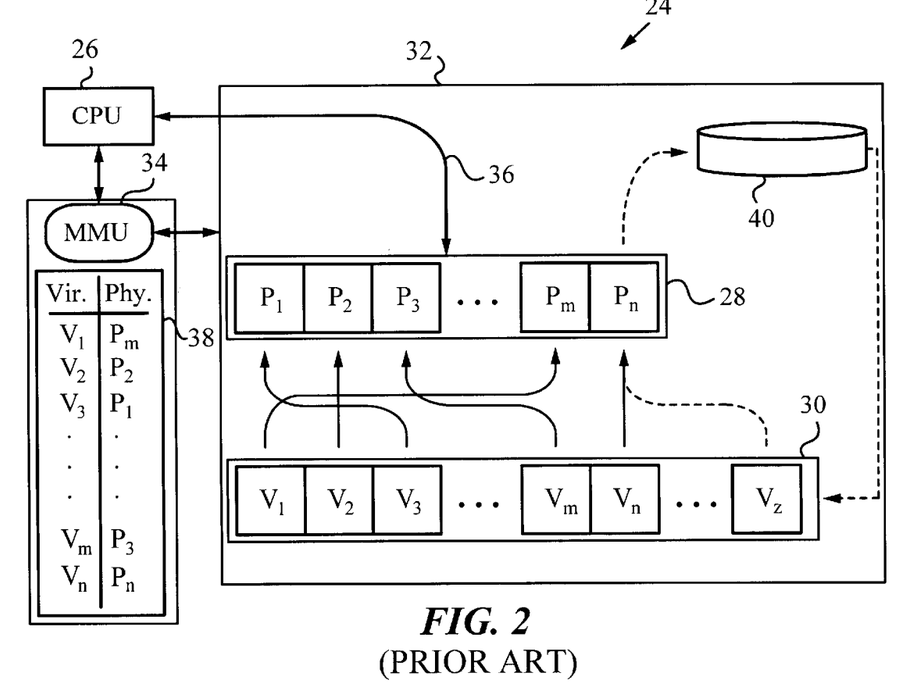
FIG. 2 (prior art) is a block diagram illustrating the operation of a computer system using a MMU and virtual memory in conjunction with a RAM.

FIG. 2 shows a portion of a computer system 24 in which a CPU 26 utilizes the data stored in a RAM 28 and extends the size of RAM 28 with the aid of a virtual memory 30. Virtual memory 30 is resident on a medium offering slower data access rates than RAM 28. For example, virtual memory 30 corresponds to storage memory on a hard disk drive 40. System 24 has a memory management unit (MMU) 32, which is in charge of performing a virtual to physical mapping to keep track of which pages of virtual memory 30 are mapped to which pages of physical memory or RAM 28. MMU 32 is connected to CPU 26. CPU 26 also has a direct data bus 36 connecting it to RAM 28.

In system 24 applications and data are placed in virtual memory 30. MMU 32 maintains a table 38 to keep track of which virtual memory page $V_j$ was assigned to which physical memory page $P_i$ of RAM 28. As RAM 28 becomes full, certain pages which are not being used can be placed back in long term memory, e.g., on hard disk drive 40 as indicated in dashed lines or in some other long term storage medium. It should be noted that typically virtual memory 30 is considerably larger than RAM 28. For more specifics about MMUs and general memory control architecture the reader is referred to U.S. Pat. No. 4,899,275 to Sachs et al. and references cited therein.

Though infrequently, RAM bits can fail and hence it is desirable to test the memory pages of RAM. Typically, computer systems test their RAM at start-up by applying various types of tests before the computer system commences normal operation and the RAM is not otherwise in use. The test is performed because RAM, as apparent from the above discussion and for other reasons, is a critical component of the computer. In most systems a program executed from the non-volatile storage, e.g., the ROM, performs these tests. For information about suitable RAM tests the reader is referred to U.S. Pat. No. 5,923,836 to Barch et al.

Certain computer systems, however, are intended to operate without interruption, i.e., once started up they are not turned off and re-started. For example, embedded control computers of the type found in communication networks are never turned off and have to operate for long periods of time, e.g., several years. Therefore, it is not feasible to test such computer systems only at start-up with a program executed from a ROM. Instead, computer systems of this type require in-use testing of their RAM while there is live data in the RAM. At present no suitable techniques for performing such in-service RAM testing exist.

OBJECTS AND ADVANTAGES

It is therefore a primary object of the present invention to provide a method for in-service testing of RAM. Specifically, the method of the invention is intended for use in computer systems designed to operate without interruption.

It is another object of the invention is to provide a simple in-service RAM testing method which can be easily implemented on any computer system requiring such testing, such as, for example, a computer system used in a communication network, such as an optical transport system.

These and other objects and advantages of the invention will become apparent upon further reading of the specification.

SUMMARY

The objects and advantages are achieved by a method for in-service testing of a random access memory (RAM) of a computer system having a virtual memory. The method calls for identifying a number n of physical memory units $p_i$, i=1 . . . n, in the RAM and a number n−1 of virtual memory units $v_j$, j=1 . . . n−1, in the virtual memory. A one-to-one mapping is performed to map the physical memory units $p_i$ to virtual memory units $v_j$ such that a physical memory unit $p_x$ is left unmapped. The data is then tested in the unmapped physical memory unit $p_x$. The testing methods used to verify the data can involve destructive data tests or non-destructive data tests. After the data in physical memory unit $p_x$ is tested, data from another physical memory unit $p_y$ is copied to physical memory unit $p_x$ and a one-to-one re-mapping of physical memory units $p_i$ to virtual memory units $v_j$ is performed such that physical memory unit $p_y$ is left unmapped. The data in physical memory unit $p_y$ is then tested. Clearly, the steps of copying, one-to-one re-mapping and testing can and are preferably repeated until all physical memory units $p_i$ are tested.

The method of the invention can be applied in a sequential manner. In other words, the one-to-one mapping can be sequential where physical memory unit $p_x$ is left out of the sequence and physical memory unit $p_y$ selected for testing after physical memory unit $p_x$ is tested is adjacent physical memory unit $p_x$ such that $p_y = p_{x \pm 1}$.

It is important to write-protect physical memory unit $p_y$ after data from it is copied to physical memory unit $p_x$ to thus prevent unwanted over-writing. Should a write request to write a new data to physical memory unit $p_y$ be received, then the writing should be enabled in order not to interfere with the regular in-service operation of the computer system and the new data should be written to physical memory unit $p_y$. However, after the new data is written it needs to also be placed in physical memory unit $p_x$. This can be done by either re-copying the new data from physical memory unit $p_y$ to physical memory unit $p_x$ or by writing the new data to physical memory unit $p_x$.

Preferably, the testing method of the invention is applied at the level of memory pages. In other words, the physical and virtual memory units are entire memory pages. Furthermore, when any defective memory units or pages are found a remedy, e.g., an error correction algorithm, can be applied to that page. Alternatively, the defective memory unit or page can be flagged and taken out of service.

Advantageously, a memory management unit (MMU) is used for performing the one-to-one mapping and the one-to-one re-mapping operations. The MMU can be placed in charge of the copy requests as well and thus be an instrumental part of the testing process in accordance with the invention.

The virtual memory units or pages used in the testing process can be located in a non-volatile memory, e.g., on a disk drive used by the computer system. Depending on the type of computer system and its lifespan, the testing should be performed at defined times. For example, the testing can be performed cyclically after certain time intervals, e.g., every minute or every day. Alternatively, the testing can be performed at a very slow rate and run continuously in the background.

The invention can be applied to a computer in a network, e.g., to a computer which is a part of a communication network. In this case the test is performed in the same manner, but the entire communication network can be alerted of the state of the physical memory units $p_i$ tested in the computer. Conveniently, when physical memory units $p_i$ are flagged for being found defective during the testing the entire network can be alerted to that fact.

The invention further encompasses a storage medium in which the steps of the method are stored. The storage medium can be any suitable non-volatile or volatile memory which can be interfaced with the computer system or is a part of the computer system.

As will be apparent to a person skilled in the art, the invention admits of a large number of embodiments and versions. The below detailed description and drawings serve to further elucidate the principles of the invention and some of its embodiments.

DETAILED DESCRIPTION

Figure 3A:
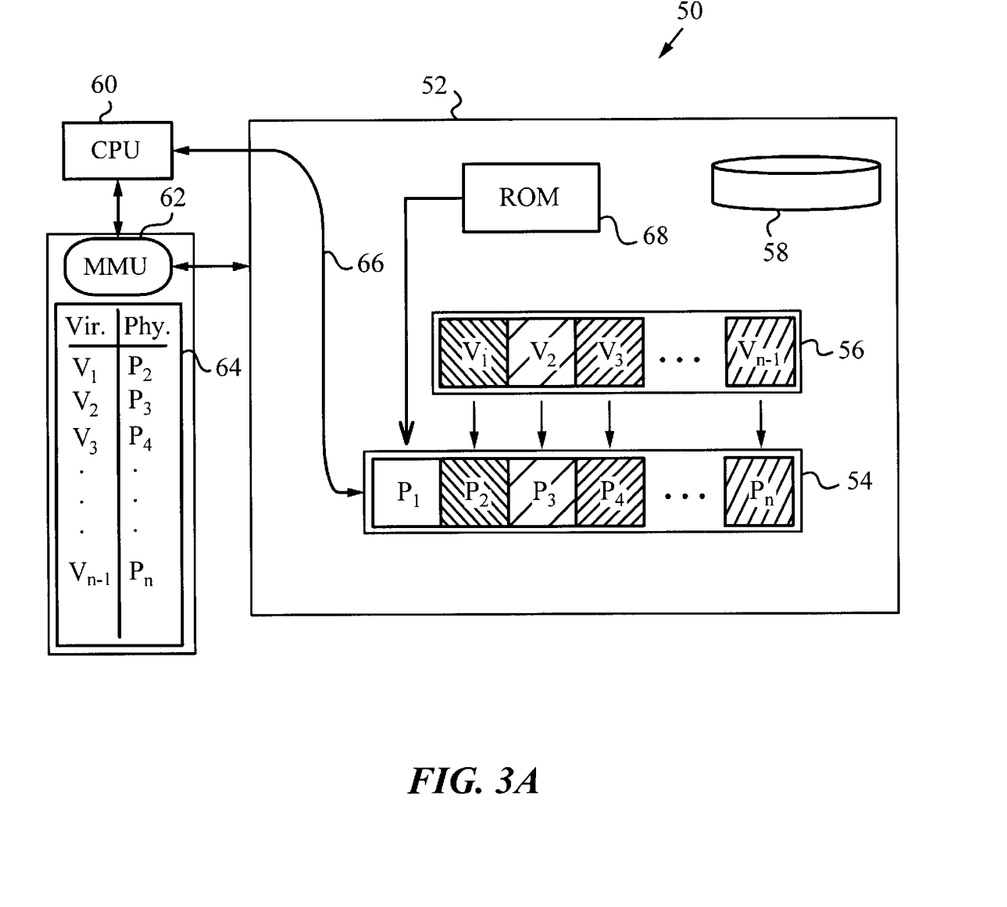
FIG. 3A–G are diagrams illustrating the testing method of the invention in a computer system.

The invention will be best understood by referring to a computer system 50 with memory resources 52 including a RAM 54, a virtual memory 56 and a disk drive 58 as illustrated in FIG. 3A. It will be understood that computer system 50 can be a part of any system designed for operation without any interruption, such as, merely by the way of example, a communication network, which could include as one component an optical transport system. Computer system 50 has a CPU 60 for performing data processing operations. CPU 60 receives data from various sources (not shown) and from memory resources 52. In the process of performing its operations CPU 60 reads data from and writes data to physical memory pages $p_i$ of RAM 54.

An MMU 62 is provided for managing memory resources 52 and for mediating the read and write requests to RAM 54 from CPU 60. Virtual memory pages $v_j$ are maintained on disk drive 58 in the present embodiment, but they can also be maintained on some other storage medium. Virtual memory pages $v_j$ contain data which is frequently requested by CPU 60. When the data on a particular virtual memory page is not loaded into any physical memory page in RAM 54 and CPU 60 requests that data or requests a write to it, the MMU 62 loads that virtual memory page into a physical memory page in RAM 54 and makes it available to CPU 60. To keep track of which physical memory pages $p_i$ correspond to which virtual memory pages $v_j$, MMU 62 maintains a table 64 of assignments between physical memory pages $p_i$ and virtual memory pages $v_j$. Least used memory pages can be removed from, in this process, RAM 56 and placed back in virtual memory 54 or they can be removed altogether to make space for pages containing more frequently requested data. A person skilled in the art will appreciate that there are many methods for determining page(s) to be replaced.

In system 50 CPU 60 has a direct connection to RAM 54 via a data bus 66 and knows what data is contained in physical memory pages $p_i$ because it has access to table 64. Thus, CPU 60 can read data from or write data to any particular physical data page of RAM 54. Also, system 50 has a read only memory (ROM) 68 in its memory resources 52. In the embodiment shown, ROM 68 has a testing algorithm for performing destructive or non-destructive tests on physical memory pages $p_i$ of RAM 54. Of course, the testing algorithm could also reside in memory unit(s) other than ROM 68, e.g., in a backing store. The types of destructive and non-destructive tests which can be used in testing RAM 54 are well-known in the art. In addition ROM 68 includes instructions on how to fix, replace or correct pages $p_i$ found defective during the test. These instructions can include error correction algorithms or flagging functions to skip defective data. Alternatively, ROM 68 can contain copies of the correct data such that defective data can simply be replaced with the correct data.

The testing method of invention is executed while computer system 50 and specifically RAM 54 is in-service. In other words, live data is loaded in physical memory pages $p_i$ of RAM 54 and CPU 60 is performing regular operations during the testing. In performing the test MMU 62 identifies a number n of physical memory pages $p_i$, i=1 . . . n, in RAM 54 and a number n−1 of virtual memory pages $v_j$, j=1 . . . n−1, in virtual memory 56.

The number n preferably includes all available physical memory pages $p_i$ of RAM 54, but it is also possible to identify a subset of them. In the event that only a subset of all physical memory pages $p_i$ is selected, MMU 62 is programmed to ensure that any interaction with remaining physical memory pages and any virtual memory pages not identified for the testing process is interrupted for the duration of the test.

To carry out the test, MMU 62 performs a one-to-one mapping to map physical memory pages $p_i$ to virtual memory pages $v_j$ such that one physical memory page $p_x$ is left unmapped. It is noted that working with more than one unmapped physical memory page $p_x$ at a time is also possible. In the example embodiment, the one-to-one mapping is sequential and the first physical memory page selected to be left unmapped is $p_1$.

Once the mapping is complete, data contained in unmapped page $p_1$ is tested by applying the testing algorithm from ROM 68. The testing algorithm can be applied directly under the supervision of MMU 62 or on direct instructions from CPU 60. CPU 60 can side-step the function of MMU 62 by instructing MMU 62 to cease translation between physical and virtual memory pages. Then, CPU 60 can instruct the testing algorithm to be applied to data in page $p_1$ while the function of MMU 62 is suspended.

Figure 3B:
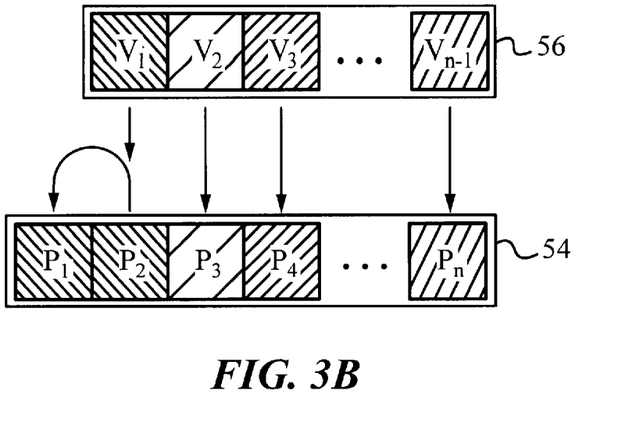
Figure 3C:
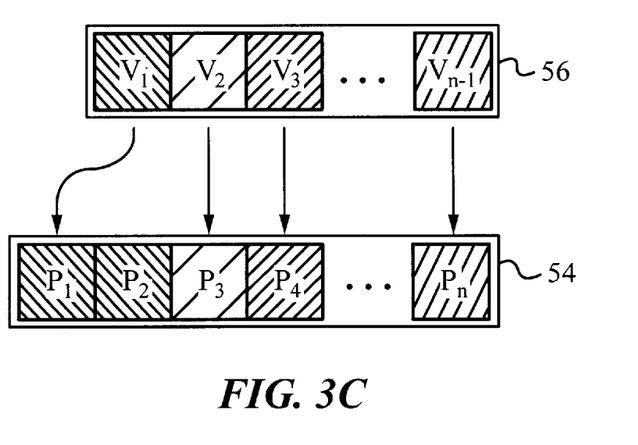
Figure 3D:
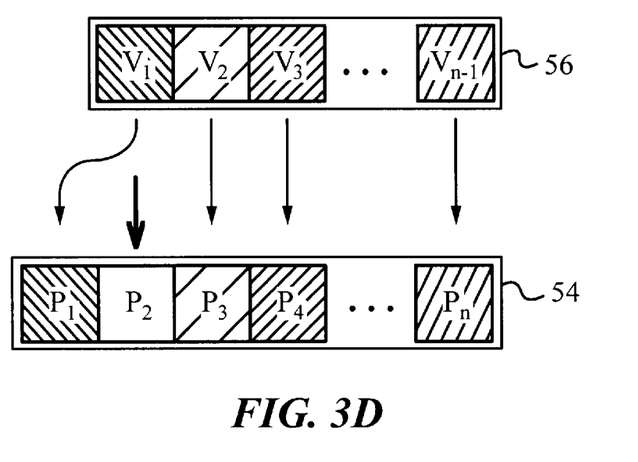
Figure 3E:
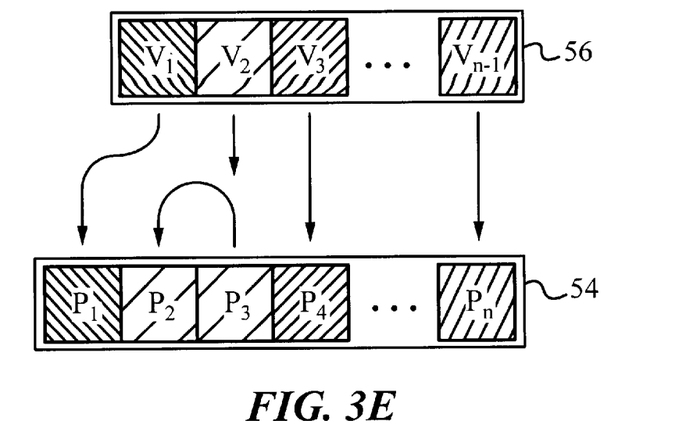
Figure 3F:
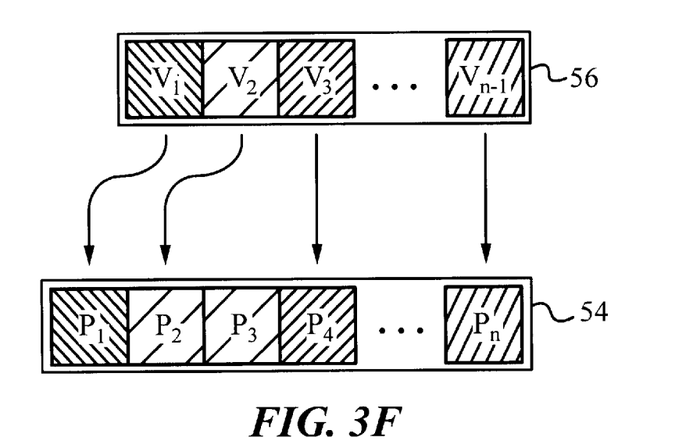
Figure 3G:
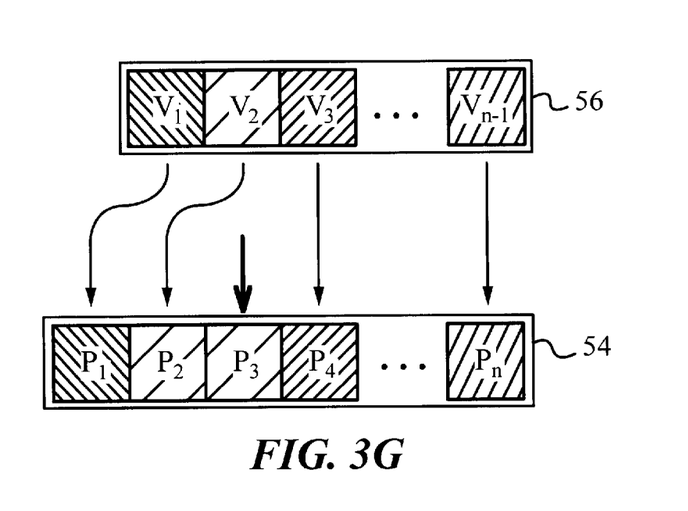

After the data in physical page $p_1$ is tested, data from another physical page $p_y$ is copied to physical page $p_1$, as shown in the diagram of FIG. 3B. Conveniently, since the testing is performed sequentially in this embodiment, physical page $p_2$ is selected as physical page $p_y$ for testing after physical page $p_1$. Then, as shown in FIG. 3C, a one-to-one re-mapping of physical pages $p_i$ to virtual pages $v_j$ is performed such that physical page $p_2$ is left unmapped while physical page $p_1$ is mapped to virtual page $v_1$. At this point physical page $p_2$ is tested by the testing algorithm, as indicated in FIG. 3D. FIGS. 3E–G illustrate how physical page $p_3$ is tested after page $p_2$ by repeating the copying, re-mapping and testing steps. The steps of copying, one-to-one re-mapping and testing can and are preferably repeated until all physical pages $p_i$ are tested.

The method of invention is preferably applied to RAM 54 at predetermined times. For example, the testing is performed cyclically or at some time intervals, e.g., every few minutes or every day. Alternatively, the testing can be implemented more frequently such as at times when computer system 50 exhibits periods of low activity. In fact, in many cases it may be advantageous to allow the testing to be running continuously as a background operation.

Figure 4:
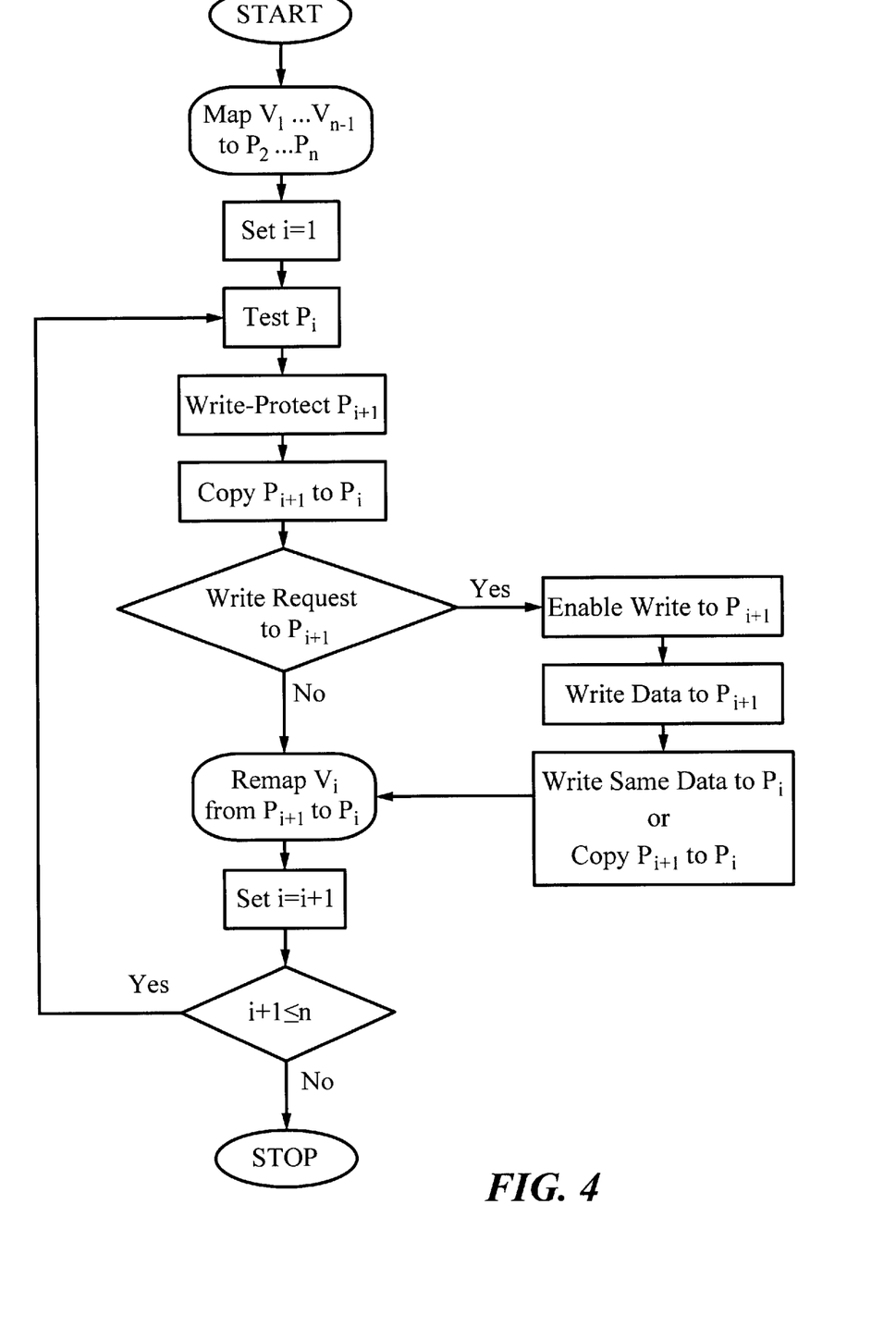
FIG. 4 is a flow diagram illustrating the steps of the method of the invention.

While performing the in-service test of RAM 54 it is important to write-protect the physical page that is being copied to prevent unwanted over-writing and loss of data. FIG. 4 illustrates an exemplary flow diagram of a computer program implementing the steps of the method with write-protect. At the start of the program the virtual and physical pages are mapped one-to-one leaving physical page $p_1$ unmapped. Then, the counter i is set to one and physical page $p_i$ ($p_i=p_1$ at this point) is tested. Next, physical page $p_{i+1}$ is write-protected and the data from physical page $p_{i+1}$ is copied to physical page $p_i$. Should a write request to physical page $p_{i+1}$ be received at this time, e.g., from CPU 60, then write to physical page $p_{i+1}$ is enabled and the new data is written to physical page $p_{i+1}$. Now, in order to prevent data loss, the new data is either written to physical page $p_i$ or copied to it from physical page $p_{i+1}$ and the steps of the program resume with re-mapping of virtual pages and physical pages such that physical page $p_{i+1}$ is left unmapped. Now the counter i is incremented and, as long as i<n, where n is the number of physical pages, and the next physical page is tested.

The program of FIG. 4 performs a sequential test of all physical pages $p_i$ starting from page $p_1$. Of course, the test can be run in some other order, depending on the architecture of the computer system being tested, its RAM, the virtual memory and the original mapping on physical to virtual pages. It will also be appreciated by a person skilled in the art that the RAM can be tested several pages at a time, or fractions thereof. Alternatively, different units of memory can be assigned for testing. For example, certain bytes at page boundaries can be tested in an alternative embodiment.

Figure 5:
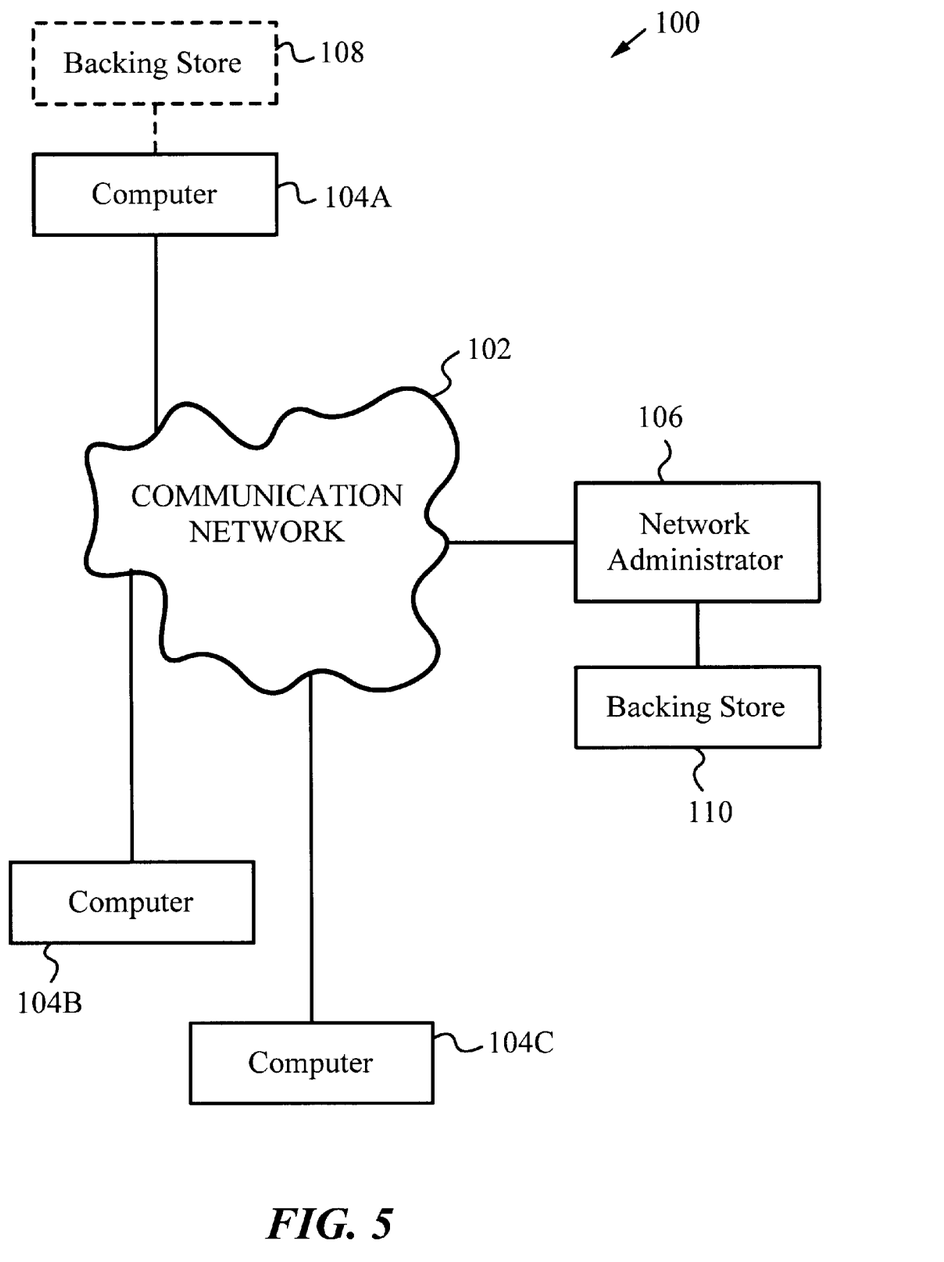
FIG. 5 is a diagram illustrating a communication network using computers employing in-service RAM testing.

Any computer system, computer making up a larger system, network computer or network system can employ the method of the invention to perform in-service testing of RAM resident at any location in the computer or network. FIG. 5 illustrates an optical transport system 100 which forms a communication network 102. Network 102 has independent computers 104A, 104B and 104C which perform in-service RAM tests in accordance with the invention.

Network 102 is administered by a network administrator 106. The RAM of each computer 104A, 104B and 104C can be tested independently or in a predetermined order on the instructions of network administrator 106. When RAMs of any one or more of computers 104A, 104B, 104C are found to contain failed bits network administrator 102 is alerted, thereby alerting entire network 102. Conveniently, physical memory units $p_i$ of the failed RAMs are flagged and network 102 can avoid them or remedy them.

In this example embodiment network administrator 106 has a backing store 110 containing copies of the correct data for all RAMs. When the RAM of any of computers 104A, 104B, 104C is found defective, backing store 110 provides the correct data for replacement. Alternatively, each computer 104A, 104B, 104C can have its own backing store. For example, a backing store 108 of computer 104A is indicated in dashed lines. Backing store 108 may be present in lieu of or even in the presence of backing store 110.

In most cases the steps of the method are stored in the form of a computer program. The computer program is preferably stored on a suitable storage medium and delivered for execution to the computer system whose RAM is to be tested in-service. The storage medium can be any suitable non-volatile or volatile memory which can be interfaced with the computer system or is a part of the computer system to be tested.

Thus, although the present invention and its advantages have been described in detail, it should be understood that various changes, substitutions, and alterations can be made herein without departing from the principle and the scope of the invention. Accordingly, the scope of the present invention should be determined by the following claims and their legal equivalents.

What is claimed is:

1. A method for in-service testing of a random access memory in a computer system having a virtual memory, said method comprising:
   a) identifying in said random access memory a number n of physical memory units $p_i$, where i=1 . . . n;
   b) identifying in said virtual memory a number n−1 of virtual memory units $v_j$, where j=1 . . . n−1;
   c) performing a one-to-one mapping of physical memory units $p_i$ to virtual memory units $v_j$ such that a physical memory unit $p_x$ is left unmapped;
   d) testing data in said physical memory unit $p_x$;
   e) copying data from a physical memory unit $p_y$ to said physical memory unit $p_x$;
   f) performing a one-to-one re-mapping of physical memory units $p_i$ to virtual memory units $v_j$ such that said physical memory unit $p_y$ is left unmapped; and
   g) testing data in said physical memory unit $p_y$.

2. The method of claim 1, wherein said one-to-one mapping is sequential with said physical memory unit $p_x$ being left out of sequence, and said physical memory unit $p_y$ left unmapped during said one-to-one re-mapping is adjacent said physical memory unit $p_x$, such that $p_y = p_{x \pm 1}$.

3. The method of claim 2, further comprising write-protecting said physical memory unit $p_y$ after said step of copying data.

4. The method of claim 3, further comprising the step of writing a new data to said physical memory unit $p_y$, in response to a write request.

5. The method of claim 4, further comprising re-copying said new data from said physical memory unit $p_y$ to said physical memory unit $p_x$.

6. The method of claim 4, further comprising writing said new data to said physical memory unit $p_x$.

7. The method of claim 1, wherein said testing is performed by a test selected from the group consisting of non-destructive data tests and destructive data tests.

8. The method of claim 1, wherein said physical memory units $p_i$ comprise memory pages.

9. The method of claim 1, wherein said copying, said one-to-one re-mapping and said testing are repeated until all physical memory units $p_i$ are tested.

10. The method of claim 9, further comprising applying a remedy to physical memory units $p_i$ found defective during said testing.

11. The method of claim 9, further comprising flagging physical memory units $p_i$ found defective during said testing.

12. The method of claim 1, wherein said one-to-one mapping and said one-to-one re-mapping are preformed by a memory management unit.

13. The method of claim 1, wherein said virtual memory units are located in a non-volatile memory unit.

14. The method of claim 1, wherein said copying, said one-to-one re-mapping and said testing are performed cyclically.

15. The method of claim 1, wherein the testing step is generated from a backing store.

16. The method of claim 1, wherein the testing step is done on more than one page at a time.

17. A method for in-service testing of a random access memory of a computer in a communication network, said computer having a virtual memory, said method comprising:

a) identifying in said random access memory a number n of physical memory units $p_i$, where i=1 . . . n;

b) identifying in said virtual memory a number n−1 of virtual memory units $v_j$, where j=1 . . . n−1;

c) performing a one-to-one mapping of physical memory units $p_i$ to virtual memory units $v_j$ such that a physical memory unit $p_x$ is left unmapped;

d) testing data in said physical memory unit $p_x$;

e) copying data from a physical memory unit $p_y$ to said physical memory unit $p_x$;

f) performing a one-to-one re-mapping of physical memory units $p_i$ to virtual memory units $v_j$ such that said physical memory unit $p_y$ is left unmapped; and g) testing data in said physical memory unit $p_y$.

18. The method of claim 17, wherein said copying, said one-to-one re-mapping and said testing are repeated until all physical memory units $p_i$ are tested.

19. The method of claim 18, further comprising applying a remedy to physical memory units $p_i$ found defective during said testing.

20. The method of claim 18, wherein said communication network is an optical transport system.

21. The method of claim 18, further comprising flagging physical memory units $p_i$ found defective during said testing.

22. The method of claim 21, further comprising alerting said communication network to physical memory units $p_i$ flagged for being found defective during said testing.

23. A storage medium tangibly embodying the steps for in-service testing of a random access memory of a computer system having a virtual memory, said steps comprising:

a) identifying in said random access memory a number n of physical memory units $p_i$, where i=1 . . . n;

b) identifying in said virtual memory a number n−1 of virtual memory units $v_j$, where j=1 . . . n−1;

c) performing a one-to-one mapping of physical memory units $p_i$ to virtual memory units $v_j$ such that a physical memory unit $p_x$ is left unmapped;

d) testing data in said physical memory unit $p_x$;

e) copying data from a physical memory unit $p_y$ to said physical memory unit $p_x$;

f) performing a one-to-one re-mapping of physical memory units $p_i$ to virtual memory units $v_j$ such that said physical memory unit $p_y$ is left unmapped; and g) testing data in said physical memory unit $p_y$.

\* \* \* \* \*